Figure 1:
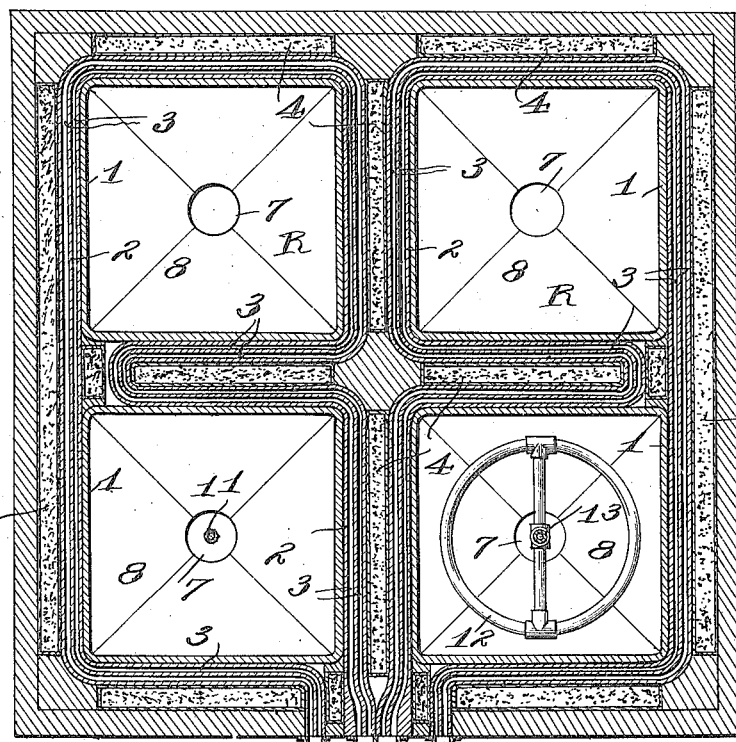

E. MONTI.
PROCESS OF CLARIFYING AND CONCENTRATING FRUIT JUICES.
APPLICATION FILED SEPT. 15, 1911.

1,158,261.

Patented Oct. 26, 1915.
2 SHEETS—SHEET 1.

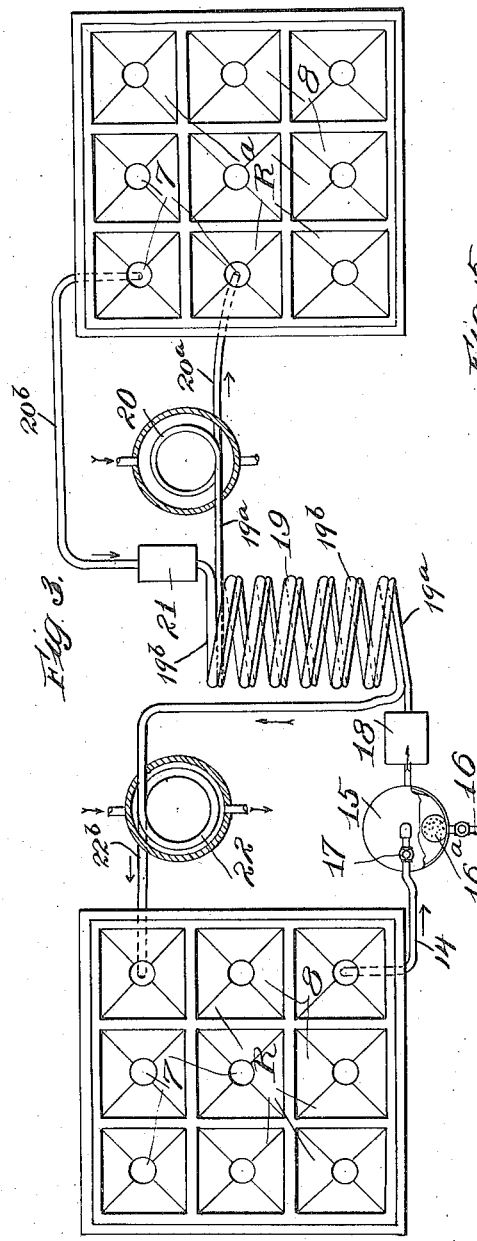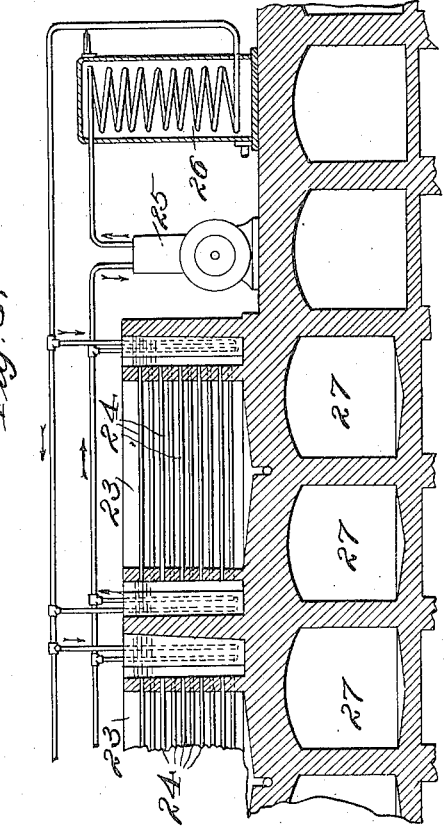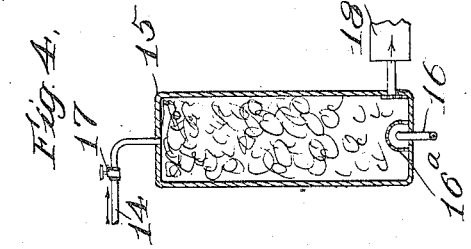

UNITED STATES PATENT OFFICE.

EUDO MONTI, OF TURIN, ITALY.

PROCESS OF CLARIFYING AND CONCENTRATING FRUIT-JUICES.

1,158,261.  Specification of Letters Patent.  Patented Oct. 26, 1915.

Original application filed April 20, 1909, Serial No. 491,408. Divided and this application filed September 15, 1911. Serial No. 649,420.

*To all whom it may concern:*

Be it known that I, EUDO MONTI, a subject of the King of Italy, residing at 20 Via Figlie dei Militari, Turin, Italy, have invented certain new and useful Improvements in Processes of Clarifying and Concentrating Fruit-Juices, of which the following is a specification.

The present invention relates to improvements in process for clarifying, maturing, aging and if necessary also of the concentration of fruit juices, particularly such as wines, liquors, musts, and spirits, by which process a product is obtained which is absolutely identical with that from a natural process.

This application is a division of my pending application Serial No. 491,408, filed April 20, 1909. This process of clarification and aging for which the apparatus illustrated in the accompanying drawings has been designed consists in the saturation with air of the solution at low temperature (near the point of congealing of said solution), and in the subsequent dissolving of the air on the return of said solution to ordinary summer heat; and further repeating the procedure, if necessary, until the complete elimination of the substances that are susceptible to produce insoluble compositions by oxidization. The natural aging of wines and spirits is due to a slow phenomenon of oxidization caused by the filtration of air through the walls of the cask and from the substances extracted from the wood of the cask. By the use of this apparatus an artificial aging is obtained in a short time in every respect identical with the very slow natural aging of cognac, spirits and wines, for which the said phenomenon of oxidization of the wood extracts from the cask has a very great importance on account of the flavor which it gives to said liquids. For this purpose chips or shavings or the like, of the same kind of wood, ordinarily employed for the casks, are filled in the special vessel through which the wines or liquids circulate mixed with finely divided air. The natural refining and maturation of the musts, giving a characteristic flavor to the musts, are also due to an oxidizing phenomenon produced by the slow passage of air through tissues surrounding the fruit or of passing through them of certain special mustiness (*Botrytis cinerea*) which renders the said phenomenon very active by destroying the pellicles enveloping the fruit.

By the use of the apparatus of the present application the suspended matter and the greater part of the ferments are separated by decantation and filtration when cold or at an ordinary temperature; the must is then concentrated nearly to the point of congealing when about 40% to 50% of sugar is obtained; a saturation with air thereupon follows and filtration if necessary; and finally the must is reheated to about 50° C. in order to render inactive the zymase without precipitating the albuminoids and the phosphates and without driving out the ether and other volatile substances, which have very great influence on the taste and the hygienic properties of the product. This process of clarifying and aging applied to musts concentrated cold, permits of obtaining products that have the characteristic flavor from musts of grapes or dried fruit and particularly of grapes that have been affected by "Edelfaule" (*Botrytis cinerea.*)

Figure 2:
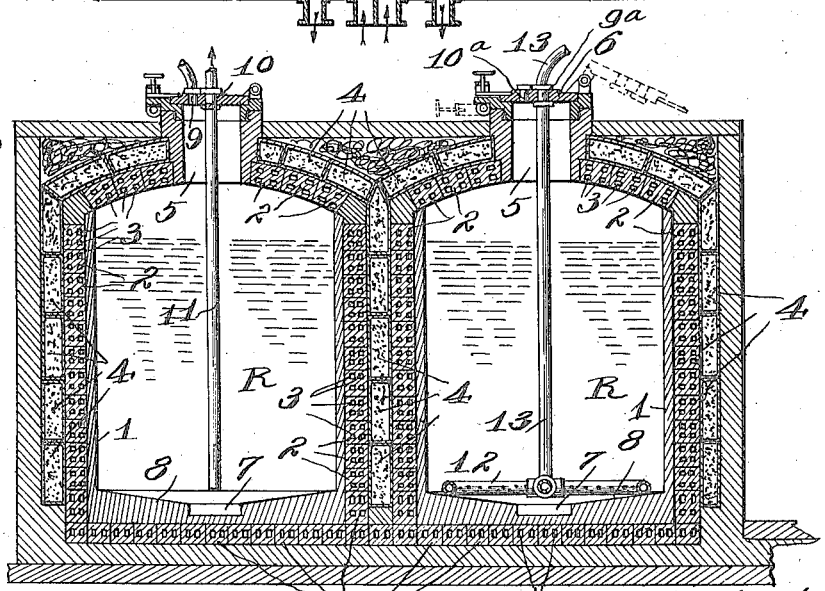

The apparatus as represented in the drawings shows the application of the process for producing wines, musts, etc., on a large scale, illustrating one embodiment of the invention, and Figure 1 is a horizontal section of a set of four tanks for clarifying and aging of the liquids; Fig. 2, a vertical section of Fig. 1, Fig. 3, a diagrammatic plan of a plant of this kind; Fig. 4, a vertical section of an apparatus for complete aging; Fig. 5, a diagrammatic vertical section of the concentrating apparatus as applied to the plant shown in Fig. 3.

In the drawings the same characters refer to the same parts of the different views.

The tanks R, in which the clarification and the first stage of aging takes place, are preferably constructed with partitions 1 of reinforced cement or concrete blocks lined with glass or china. These partitions have a layer 2 of bricks, concrete blocks or the like; perforated and adapted to insure a rational circulation, through the conduit 3 formed by them, of a very dry current, having the temperature at which it is desired to maintain the solution in the tank (see the arrangement in Fig. 1 for four communicating tanks).

Between the perforated layers of two adjacent tanks, and between the outside of the layers and the masonry of the casing is interposed a box layer of tin plate, zinc or other suitable material having its outer surface polished, hermetically closed and containing sawdust, ashes or any other pulverized substance that is perfectly dry. These boxes constitute an economic means, in the highest degree insulated in order to keep the air continuously dry and are subdivided for closing, and with their polished walls almost completely reflecting the heat. It is obvious, that when the current ceases to circulate through the conduit, the perforated layer also aids the thermic insulation of the tanks because the inclosed fluid (preferably air) has been previously dried—or because of the effect of refrigeration in case the fluid has been cooled—or because of the fluid running through a receptacle, in case it should have the temperature of summer heat, is apt to give an opposing current with a fluid of for instance chlorid of calcium.

The upper part 5 of each tank is closed by a lid 6 turning on hinges. Through the opening 5 access may be had to the interior for cleaning and removing the deposits that have collected during the operation in the central recess 7 at the bottom 8 of the tank.

Two holes 9 and 10 have been made in the lid, which are ordinarily closed by means of two bolts 9ᵃ and 10ᵃ; these holes serve for filling and discharging the liquid in the tank. It would be sufficient to adapt one of the two tubes 11 to reach nearly to the bottom. The liquid is now introduced through said tube while the air escapes through the other hole, which is left open. To extract the liquid, on the other hand, it may be carried away through tube 11 by suction or else by means of affixing a tube to the other hole, introducing air or any other gas under pressure, thereby forcing the liquid through the tube 11.

To saturate the solution with air, a tube 12 is disposed at the bottom 8 of the tank, which tube is entirely perforated and of circular or any other shape, and through this tube cold air is made to pass, entering under pressure from tube 13, which is, preferably, taken through one of the holes in the lid, the other hole being left open for escape of excess of air which has not been dissolved on passing through the solution, and which air might possibly be used for a subsequent airing of the vessels for the purpose of avoiding all waste of alcohol or ether.

The plant shown diagrammatically in Fig. 3 for clarifying and aging of wines, musts, etc., comprises two sets of tanks, of which one set R is intended for the cold treatment of the solution and for the saturation thereof with air; the other set of tanks Rᵃ intended for treatment at ordinary summer temperature. Through the conduits surrounding the tanks, a fluid is made to circulate of the same temperature as the solution is intended to have, as described above. When, after a certain time, the solution has to be transferred from a tank R to a tank Rᵃ, it is first made to pass, under pressure, and through a tube 14, into one or several flavoring receptacles 15 arranged in series, which are filled with chips or whole pieces of wood that has the property required to produce the complete aging of the liquid. Instead of the wood itself, an extract thereof may be utilized in the receptacle 15. Into this receptacle 15 dry and sterilized air, as finely divided as possible by means of a sieve 16ᵃ is injected under pressure and in opposite direction through tube 16. The solution being now intimately intermingled with air, should be filtered as slowly as possible in order to permit the wood or wood extract to oxidize on contact with the air and to be incorporated with the solution. This object is attained by regulating the cock 17 and by thus varying at will the speed with which the solution travels from tank R to the flavoring receptacle 15. The solution passes subsequently through a filter 18 where it delivers all the suspended substances with which it is mixed, and thereupon through the pipe 19ᵃ of the temperator 19 through which simultaneously circulates in pipe 19ᵇ the solution in an opposing current, comparatively cold coming from one of the tanks Rᵃ (which is the practice when large quantities of solution are treated) whereby considerable economy is gained for recuperating the heat, due to the therminal exchange between the two solutions. The solution, now lightly heated, passes from the temperator into the coils of the heater 20, in which its temperature by means of the circulation of a surrounding liquid of desired temperature, is further raised to the one existing in the tanks Rᵃ into which the solution is immediately introduced by pipe 20ᵃ and retained there for the time required.

The transfer of the solution from a warm tank, Rᵃ to a cold one R, through the pipe 20ᵇ the filter 21 (where the temperature is partly lowered by the counter current) the pipe 19ᵇ of the temperator 19 and the coils of the cooler 22, where the solution will receive the temperature of the tanks R, and through pipe 22ᵇ into one of the tanks R, need no further explanation. For cognac, spirits and some special wines, it is advisable to insert one or more of the flavoring receptacles 15 in the circuit of the solution between the warm tank Rᵃ to the cold one R, so as to acquire for the solution in a perfect manner, the taste and characteristic of the natural aging.

In Fig. 5 is represented diagrammatically, a plant for concentration of the solution (previous or subsequent) by means of congealing. This plant comprises a number of congealing vats in which are disposed cooling pipes 24, through which circulates the fluid which has been compressed in the compressor 25, and refrigerated in the condenser 26. Below the vats 23 are found the chambers 27 which serve to receive the concentrated solutions as well as the more and more diluted solutions.

It is easy to comprehend how it is possible by means of the plants represented in Figs. 3 and 5 to effect in a simple, rational and practical manner all the operations of clarifying, aging and concentrating the treated solution without regard to what kind of wines or musts etc. it might be, or whether it has already undergone, or is subsequently to undergo, any other treatment.

It is obvious that the two plants shown in Figs. 3 and 5, might be run independent as well as in combination with each other.

The expression fruit juices in the claims is intended to include such fruit juices as wine musts and spirits whether fermented or unfermented.

I claim:—

1. The process of clarifying and concentrating fruit juices, which have been obtained by the pressing of berries or other fruit, said process consisting in first cooling the fruit juice in suitable tanks at a temperature slightly above its freezing point while saturating the juice with air; in thereupon drawing off the thus clarified juice from the dregs and slowly passing the clarified juice through a counter current of sterilized air at a still very low temperature; in then filtering the clarified juice and gradually warming it to somewhat below curdling point; lastly in storing the filtered juice at this high temperature.

2. The process of clarifying and concentrating fruit juices, which have been obtained by the pressing of berries or other fruit, said process consisting in first cooling the fruit juice approximately to the point of congealing in suitable tanks while saturating the juice with air; in thereupon drawing off the thus clarified juice from the dregs; then slowly passing all the clarified juice through a counter current of sterilized air at about the same temperature, and preferably in the presence of wood-shavings; in then filtering the clarified juice and gradually warming it to not over 50° C.; in then storing the filtered juice at this high temperature and in lastly retreating the filtered and stored juice by repeating this process.

3. The process of clarifying and concentrating fruit juices, which have been obtained by the pressing of berries or other fruit, said process consisting in first cooling the fruit juice approximately to the point of congealing in suitable tanks while saturating the juice with air; in thereupon drawing off the thus clarified juice from the dregs and letting it set for a certain time; in then slowly passing the clarified juice through a counter current of sterilized air at about the same temperature, and preferably in the presence of wood-shavings; in then filtering the clarified juice and gradually warming it to not over 50° C.; in then storing the filtered juice at this high temperature and in lastly retreating the filtered and stored juice by repeating this process.

The foregoing specification signed at Turin, Italy this 26th day of August, 1911.

EUDO MONTI.

In presence of—
JOCELYN GOUBEYRAN,
BOARIO STEPHANO.